(12) United States Patent
Armbruster

(10) Patent No.: US 6,595,482 B1
(45) Date of Patent: Jul. 22, 2003

(54) MAGNETIC SUSPENSION BRACKET CONSTRUCTION

(76) Inventor: Franz O. Armbruster, 18599 E. Louisiana Ave., Aurora, CO (US) 80017

( * ) Notice: Subject to any disclaimer, the term of this patent is extended or adjusted under 35 U.S.C. 154(b) by 0 days.

(21) Appl. No.: 10/208,700

(22) Filed: Jul. 29, 2002

(51) Int. Cl.⁷ .............................................. F16M 13/00
(52) U.S. Cl. .................................................... 248/544
(58) Field of Search ................................ 248/544, 683, 248/206.5, 317, 343, 339, 340

(56) References Cited

U.S. PATENT DOCUMENTS

| | | | |
|---|---|---|---|
| 4,207,697 A | * 6/1980 | Murphy | 40/600 |
| 5,188,332 A | 2/1993 | Callas | 248/544 |
| D346,950 S | 5/1994 | Dunn et al. | D8/367 |
| 5,381,991 A | * 1/1995 | Stocker | 248/206.5 |
| 5,414,969 A | 5/1995 | Krejci et al. | 52/311.3 |
| 5,746,329 A | 5/1998 | Rondeau | 211/123 |
| 6,435,464 B1 | * 8/2002 | Sullivan et al. | 248/340 |

* cited by examiner

Primary Examiner—Ramon O. Ramirez
(74) Attorney, Agent, or Firm—Sturm & Fix LLP

(57) ABSTRACT

A magnetic suspension bracket construction (10) adapted for use with the metal gridwork (100) that supports drop ceiling tiles (101) and diverse articles such as yardsticks (200) wherein, the construction (10) includes a bracket member (20) having a generally flat base element (21) provided with a magnetic strip (22) adapted to engage the metal gridwork (100) wherein, the bottom surface (23) of the base element (21) is provided with a pair of outer downwardly depending support fingers (24) (24') and an intermediate finger (25) adapted to releasably engage a yardstick (200) in a vertical fashion wherein, the outer support fingers (24) (24') are also provided with recesses (26) that are adapted to support the yardstick (200) in a horizontal fashion.

19 Claims, 1 Drawing Sheet

MAGNETIC SUSPENSION BRACKET CONSTRUCTION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of specialized suspension brackets in general and in particular to a multi-use magnetic suspension bracket construction adapted to releasably engage the metal gridwork supporting suspended ceiling tiles.

2. Description of Related Art

As can be seen by reference to the following U.S. Pat. Nos. 5,746,329; 5,188,332; 5,414,969; and Des. Pat. No. 346, 950, the prior art is replete with myriad and diverse magnetic based suspension brackets employed for a variety of different reasons.

While all of the aforementioned prior art constructions are more than adequate for the basic purpose and function for which they have been specifically designed, they are uniformly deficient with respect to their failure to provide a simple, efficient, and practical magnetic suspension bracket that is specifically designed to be intalled and removed by a common yardstick in order to suspend diverse articles such as posters, balloons, artwork, etc., from the metal gridwork that is employed to suspend ceiling tiles from a drop ceiling arrangement.

Given the fact that drop ceilings enjoy widespread usage in both office and retail spaces, it is rather surprising that to date no one has developed a simple and efficient device to suspend diverse articles such as posters, retail advertising and/or decorative items from this otherwise unused space.

As a consequence of the foregoing situation, there has existed a longstanding need among office workers and retail stores for a new and improved magnetic suspension bracket construction that can be installed and removed easily without the hazard of standing on a chair or desk and has myriad uses, and the provision of such an arrangement is the stated objective of the present invention.

BRIEF SUMMARY OF THE INVENTION

Briefly stated, the bracket construction that forms the basis of the present invention comprises in general a bracket member having a horizontal base element provided with a plurality of downwardly depending support fingers adapted to releasably engage and suspend diverse articles such as support hooks and other decorative objects wherein the upper surface of the base element is magnetically attracted to the metal gridwork that supports the ceiling tiles in a drop ceiling arrangement.

As will be explained in greater detail further on in the specification, the plurality of downwardly depending support fingers includes a pair of mirror image generally axially aligned outer support fingers and an intermediate axially offset support finger all provided with central apertures adapted to receive support hooks; wherein, the opposed ends of the outer support fingers are provided with offset detents that cooperate with the intermediate support finger to releasably engage a yardstick in a vertical orientation.

In addition, the outer ends of each of the outer support fingers are provided with generally L-shaped recesses disposed adjacent the juncture of the support fingers and the base element; wherein, the leg of the recesses are adapted to engage and releasably support a yardstick in a horizontal disposition; and, wherein, the foot of each recess is adapted to releasably support a support hook or strand of material that may be suspended between spaced bracket members.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
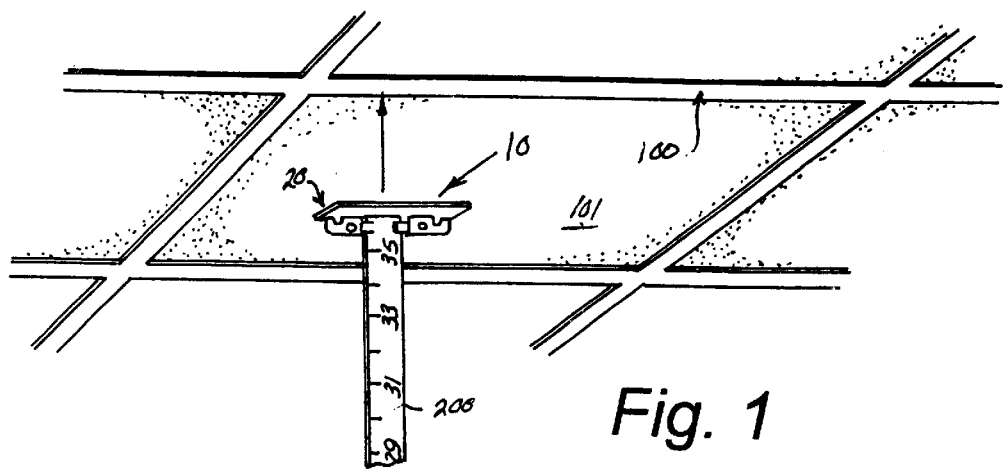
FIG. 1 is a perspective view of the magnetic suspension bracket construction in use.
Figure 2:
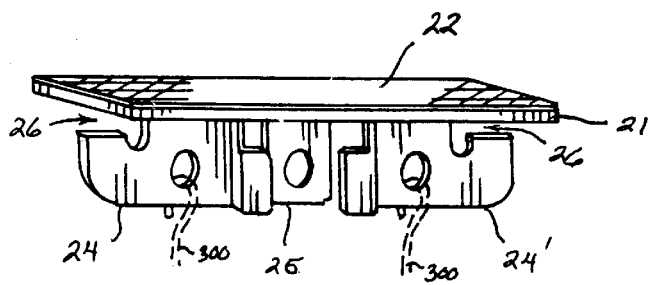
FIG. 2 is an isolated perspective view of the bracket construction.

As can be seen by reference to the drawings, and in particularly to FIGS. 1 and 2, the magnetic suspension bracket construction that forms the basis of the present invention is designated generally by the reference number 10. The construction 10 comprises in general a bracket member 20 having an elongated generally flat rectangular base element 21 the upper surface of which is provided with a magnetic strip 22 that is adapted to releasably attach the base element 21 to a selected portion of the metal gridwork 100 that supports drop ceiling tiles 101 in a well recognized drop ceiling arrangement.

Figure 4:
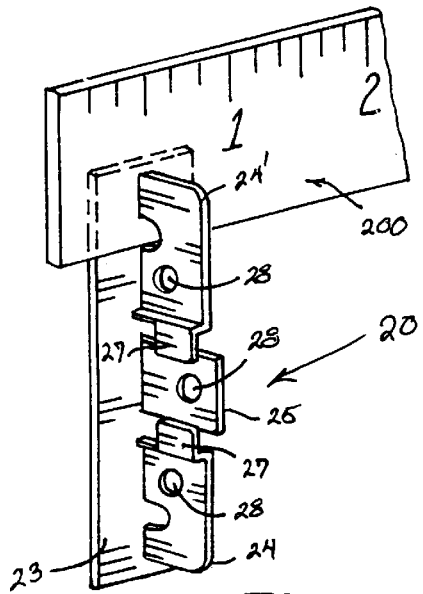
FIG. 4 is a perspective view of one of the outer gripping finger elements engaged with one end of a yardstick; and, FIG. 5 is a perspective view of a yardstick suspended between two spaced bracket members.
Figure 3:
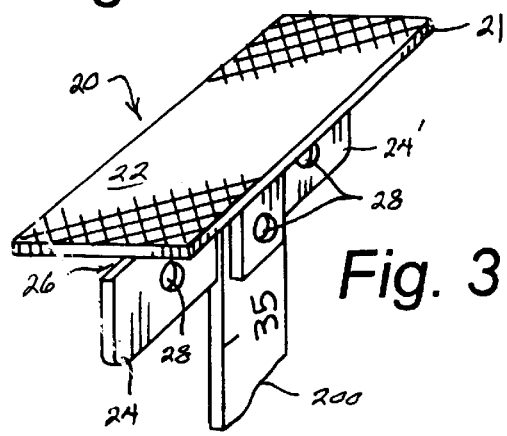
FIG. 3 is a perspective view showing a yardstick being used to install the bracket and being enclosed by gripping finger elements.

Turning now to FIGS. 2 through 4, it can be seen that the bottom surface 23 of the base element 21 is provided with a plurality of generally axially aligned mirror outer support fingers 24 24' and an intermediate support finger 25 the purpose and function of which will be described presently.

Each of the outer support fingers 24 24' has a contoured generally L-shaped recess 26 formed on their outer ends adjacent the juncture of the outer support fingers 24 24' with the bottom 23 of the base element 21 wherein the leg portion of the L-shaped recess 26 is dimensioned to laterally receive such diverse items as the side of a yardstick 200 or suspension hook 300 and the foot portion of the recess 26 is adapted to releasably retain a hook 300.

In addition, each of the outer support fingers 24 24' is provided with axially offset gripping detents 27 which cooperate with the generally straight rectangular shaped intermediate support finger 25 to frictionally engage a yardstick 200 in a vertical orientation as depicted in FIGS. 1 and 3.

Figure 5:
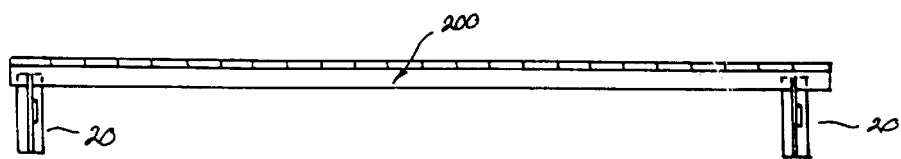

As can also be appreciated by reference to FIGS. 2 through 4, each of the support fingers 24 24' and 25 is further provided with centrally disposed apertures 28 that are also dimensioned to receive suspension hooks 300; wherein, as shown in FIGS. 1, 3,and 5, the bracket construction 10 can be used alone or in pairs to suspend and support a variety of different items 200 300 in either a vertical or a horizontal orientation relative to the drop ceiling framework 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A magnetic suspension bracket construction adapted for use with the metal gridwork that supports drop ceiling tiles and diverse articles such as balloons, placards, yardsticks, and support hooks, wherein, the bracket construction comprises:

a bracket member having a generally flat base element including an upper surface provided with a magnetic strip and a lower surface provided with a plurality of downwardly depending support fingers that include a pair of axially aligned outer support fingers.

2. The bracket construction as in claim 1; wherein, at least one of the plurality of support fingers is provided with an aperture.

3. The bracket construction as in claim 2; wherein, at least one of the plurality of support fingers is provided with a recess dimensioned to receive and releasably engage the side of a yardstick.

4. The bracket construction as in claim 2; wherein, selected ones of the plurality of support fingers are adapted to releasably engage a yardstick in both a horizontal and a vertical orientation.

5. The bracket construction as in claim 1; wherein, at least one of the plurality of support fingers is provided with a recess dimensioned to receive and captively engage the side of a yardstick.

6. The construction as in claim 5; wherein, selected ones of the plurality of support fingers are adapted to releasably engage a yardstick in both a horizontal and a vertical orientation.

7. The bracket construction as in claim 5; wherein, said recess has a generally L-shaped configuration.

8. The bracket construction as in claim 1; wherein, selected ones of the plurality of support fingers are adapted to releasably engage a yardstick in both a horizontal and a vertical orientation.

9. The bracket construction as in claim 1; wherein, said plurality of support fingers further includes an intermediate support finger.

10. The bracket construction as in claim 9; wherein, at least one of the support fingers is provided with a central aperture.

11. The bracket construction as in claim 9; wherein, all of the support fingers are provided with a central aperture.

12. The bracket construction as in claim 9; wherein, the intermediate support finger is axially offset from the pair of axially aligned outer support fingers.

13. The bracket construction as in claim 12; wherein, at least one of the support fingers is provided with a central aperture.

14. The bracket construction as in claim 13; wherein, selected ones of the plurality of support fingers are adapted to releasably engage a yardstick in both a horizontal and a vertical orientation.

15. The bracket construction as in claim 13; wherein, at least one of the plurality of support fingers is provided with a recess dimensioned to receive and releasably engage the side of a yardstick.

16. The bracket construction as in claim 13; wherein, said recess has a generally L-shaped configuration.

17. The bracket construction as in claim 1; wherein, each of said pair of axially aligned outer support fingers have an outboard end provided with a recess dimensioned to receive and captively engage the side of a yardstick.

18. The bracket construction as in claim 17; wherein, said plurality of support fingers further includes an intermediate support finger.

19. The bracket construction as in claim 18; wherein, each of said pair of outer support fingers has an inboard end provided with an axially offset detent; wherein, the offset detents and the intermediate support finger are adapted to releasably engage yardstick in a vertical orientation relative to the metal gridwork.

\* \* \* \* \*